(12) United States Patent
Speth

(10) Patent No.: US 6,660,066 B2
(45) Date of Patent: Dec. 9, 2003

(54) AMMONIA RECOVERY FROM PURGE GAS

(75) Inventor: Christian Speth, Lynge (DK)

(73) Assignee: Haldor Topsoe A/S, Lyngby (DK)

(*) Notice: Subject to any disclaimer, the term of this patent is extended or adjusted under 35 U.S.C. 154(b) by 0 days.

(21) Appl. No.: 10/379,583

(22) Filed: Mar. 6, 2003

(65) Prior Publication Data

US 2003/0172809 A1 Sep. 18, 2003

(30) Foreign Application Priority Data

Mar. 16, 2002 (DK) .............................. 2002 00418

(51) Int. Cl.[7] .............................. B01D 53/047
(52) U.S. Cl. .............................. 95/128; 95/98; 95/105
(58) Field of Search .............................. 95/98, 104, 105, 95/114, 128

(56) References Cited

U.S. PATENT DOCUMENTS

| | | | | |
|---|---|---|---|---|
| 3,531,246 A | * | 9/1970 | Matsen .............................. | 502/64 |
| 3,702,525 A | | 11/1972 | Simonet et al. | |
| 4,077,780 A | | 3/1978 | Doshi | |
| 4,266,957 A | | 5/1981 | Isalski | |
| 4,537,760 A | | 8/1985 | Lavie | |
| 4,624,841 A | * | 11/1986 | Hidaki .............................. | 423/359 |
| 4,689,062 A | | 8/1987 | MacLean et al. | |
| 4,752,311 A | * | 6/1988 | MacLean et al. .............................. | 62/624 |
| 5,013,335 A | * | 5/1991 | Marcus .............................. | 95/128 |
| 5,531,809 A | * | 7/1996 | Golden et al. .............................. | 95/101 |
| 5,711,926 A | | 1/1998 | Knaebel | |
| 5,897,687 A | * | 4/1999 | Shimada et al. .............................. | 95/128 |
| 5,968,232 A | | 10/1999 | Whitlock | |
| 6,086,840 A | | 7/2000 | Whitney et al. | |
| 6,261,345 B1 | * | 7/2001 | Miyano et al. .............................. | 95/96 |

* cited by examiner

Primary Examiner—Robert H. Spitzer
(74) Attorney, Agent, or Firm—Dickstein Shapiro Morin & Oshinsky, LLP

(57) ABSTRACT

The invention relates to ammonia synthesis loops containing gases, which do not react and would accumulate if they were not purged out. By the present invention ammonia in a purge gas is recovered by an absorption agent operating at the full synthesis loop pressure. The absorption agent is chosen in such a way that the ammonia can be removed again by passing a gas comprising hydrogen and nitrogen through it at the same elevated pressure as the loop pressure. This enables the adsorption agent to be regenerated by fresh synthesis gas coming from the synthesis gas compressor just before this gas enters the synthesis loop. Thereby, the regeneration requires an absolute minimum of energy consumption and equipment.

5 Claims, 1 Drawing Sheet

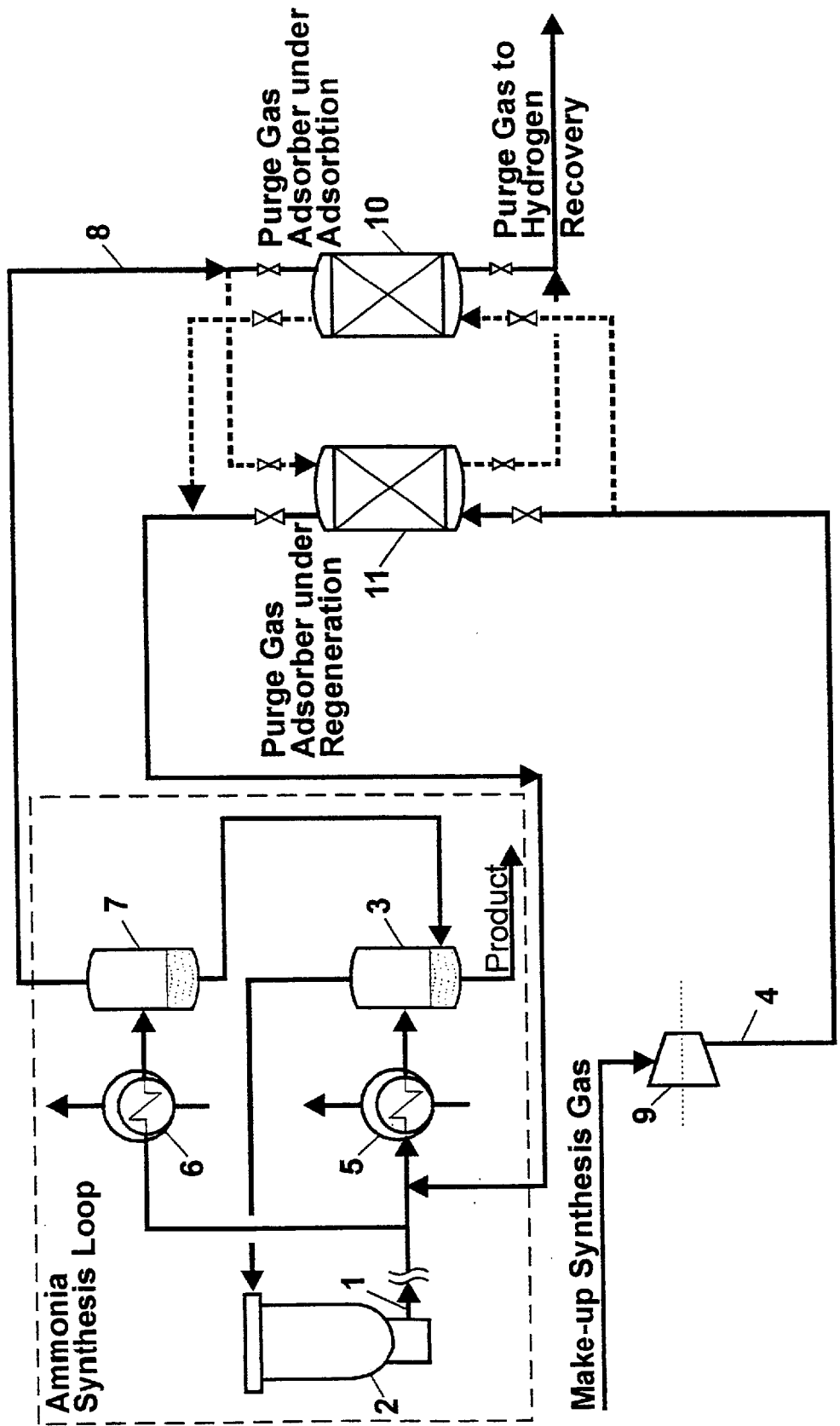

AMMONIA RECOVERY FROM PURGE GAS

BACKGROUND OF THE INVENTION

1. Field of the Invention

The invention relates to recovery of ammonia in gas purged out from a synthesis loop in an ammonia producing factory.

The invention is specifically directed to adsorption of the ammonia in purge gas in a packed bed and returning the adsorbed ammonia to the synthesis loop.

2. Description of Related Art

The traditional purge gas absorption is carried out as absorption in water in counter-current followed by recovery by distillation. This is simple and reliable but uneconomic in terms of investment and also in terms of energy consumption since medium pressure steam is needed for the distillation, cleaned washing water has to be pumped back to the absorption tower and some of the liquid streams have to be cooled down by cooling water.

Alternatively, the purge gas could be routed through a molecular sieve or another porous ammonia absorbing bulk material.

Isalki discloses a process for ammonia adsorption from a purge gas in U.S. Pat. No. 4,266,957. This process involves regeneration of the adsorbing agent at a pressure very near to atmospheric pressure by flushing out the adsorbed ammonia with hydrogen from the cleaned purge gas.

In U.S. Pat. No. 4,077,780, Doshi describes another process for adsorption of ammonia and methane in a purge gas from an ammonia synthesis loop. Here four adsorbers are involved and the regeneration of adsorbing agent takes place at approximately atmospheric pressure in this pressures wing adsorbing process. Some of the cleaned purge gas is used for the regeneration, and the effluent gas from the regeneration is sent to a waste manifold.

SUMMARY OF THE INVENTION

The invention relates to ammonia synthesis loops, in which some of the gases do not react and would accumulate if they were not purged out. However, these purge gas streams contain some amounts of valuable product ammonia.

This ammonia is then recovered by distillation of the washing water or flushing out from the adsorbing agent at low pressure.

The mentioned processes require investments for distillation systems, washing water circulation systems, including pumps and heat exchangers, valves for depressurisation and returning to high pressure synthesis loop, besides cost of energy for pumps, compressors and steam for distillation.

The object of the invention is to provide an improved ammonia synthesis process by recovering the ammonia in the purge gas with an adsorption agent operating at the full synthesis loop pressure. The adsorption agent is chosen in such a way that the ammonia can be removed again by passing a gas containing hydrogen and nitrogen through it at the same elevated pressure as the loop pressure. This enables the adsorption agent to be regenerated by fresh synthesis gas coming from a synthesis gas compressor before this gas enters the synthesis loop.

Accordingly, the present invention provides a process for removal and subsequent recovery of ammonia from a purge gas stream comprising ammonia, hydrogen, nitrogen, argon, helium and methane in an ammonia synthesis loop comprising the steps of introducing the purge gas stream into a first ammonia adsorber comprising a selective ammonia adsorbing agent, adsorbing ammonia in the purge gas on the ammonia adsorbing agent at the same pressure as the pressure of the synthesis loop, withdrawing an ammonia free purge gas from the first ammonia adsorber, introducing a make-up gas stream comprising hydrogen, nitrogen and traces of at least one of argon, helium and methane to a second ammonia adsorber comprising a selective ammonia adsorbing agent saturated with ammonia, removing ammonia from the ammonia adsorbing agent by the make-up gas at the same pressure as the pressure in the synthesis loop, withdrawing an ammonia containing effluent from the second ammonia adsorber and introducing the effluent to the ammonia synthesis loop at the normal make-up gas addition point, and introducing after a pre-set period of time the purge gas to the second ammonia adsorber and simultaneously introducing the ammonia free make-up gas to the first ammonia adsorber as in the above steps.

This is a method for cheap, effective regain of ammonia from a purge gas stream without high investments and costs for distillation towers, washing water circulation pumps, compressors, heat exchangers, steam and several control valves.

BRIEF DESCRIPTION OF THE DRAWING

The sole FIGURE shows a flow sheet of an ammonia synthesis loop, where the ammonia in the purge gas is recovered by the process of the invention.

DETAILED DESCRIPTION OF THE INVENTION

It has now been found that some adsorption agents are able to selectively adsorb ammonia in a purge gas from an ammonia synthesis loop, and that the ammonia is removed again by an ammonia free gas stream containing hydrogen and nitrogen at the same elevated pressure as the one of the synthesis loop, and that this ammonia free gas stream conveniently can be the make-up gas stream to the synthesis loop.

For the description of the process of the invention, reference to the FIGURE is made.

This FIGURE depicts an ammonia synthesis loop, where the effluent 1 from the ammonia converter 2 is cooled in a number of heat exchangers, the produced ammonia is condensed and separated from the gas phase in a separator 3. The gas phase is returned to the converter.

The feed stream 4 to the synthesis loop contains hydrogen, nitrogen and small amounts of methane and argon. The hydrogen and nitrogen replace or make up for the hydrogen and nitrogen used in the conversion to ammonia. The feed stream 4 is thereby also called the make-up gas stream.

As methane and argon are not converted, they would accumulate in the loop if they were not purged out from the loop.

This purge is performed upstream of the last chiller 5 and the separator 3 in the synthesis loop. After further cooling and condensation in purge gas chiller 6, and separation of the purge gas in purge gas separator 7, the condensed ammonia is returned to the loop, and the gas phase 8 is introduced to an ammonia adsorbing unit.

The adsorbing unit constitutes two vessels containing an ammonia adsorption agent. The purge gas is sent through one vessel 10, where the ammonia is adsorbed. Simultaneously the other vessel 11 containing saturated adsorption agent is undergoing regeneration. This is performed by routing the make up gas 4 from the synthesis gas compressor 9 through the adsorber before the make up gas is introduced to the ammonia synthesis loop upstream of ammonia chiller 5, i. e. the last heat exchanger before the separator 3 but downstream of the purge gas extraction 6 and 7.

In this way the ammonia content of the purge gas is returned to the synthesis loop and combined with the product ammonia, and this is done without any depressurisation and re-pressurisation to the high loop pressure, which typically is 140 bar. The pressure drop in the adsorbent is the only energy consumer in the process of the invention, as the chiller load will remain the same due to the pore evaporation.

Useful materials as adsorbent for the invention are solid zeolites or materials forming complexes with ammonia such as Ni, Co, Cu or Zn, which can be in the form of sulphides typically on a carrier, for instance alumina.

In a typical 2000 MTPD ammonia plant 22500 $Nm^3/h$ purge gas is taken from the synthesis loop at an ammonia concentration of 4%. This corresponds to 900 $Nm^3/h$ ammonia. Assuming the adsorbent has an ammonia capacity of 125 $Nm^3$ ammonia/$m^3$ adsorbent, an adsorber with 5 $m^3$ adsorbent would be able to contain ammonia after ½–¾ hour of purging. Due to pore condensation in the adsorbent the gas outlet temperature will be slightly higher than the inlet temperature, which is a benefit for a typical subsequent hydrogen recovery unit.

The process of the invention can be applied in place of conventional processes requiring a tower for the absorption of ammonia in water, a tower for distillation of the ammonia water to regain the ammonia, pump for washing water circulation between the two towers operating at different pressures and heat exchangers besides various valves. Conventional processes also include, besides this investment, cost of steam and cooling water contrary to the process of the invention.

EXAMPLE 1.1710 gram of $Y/SiO_2$—$Al_2O_3$ zeolite containing 30 wt % zeolite Y was crushed and sieved to fraction 0.3–0.8 mm and loaded in a tubular reactor with 9 mm diameter. The zeolite was dried in a flow of 30 Nl/h of $N_2$ at 400° C. and 1 bar for 4 h. Hereafter the catalyst was cooled to room temperature.

The zeolite was then exposed to a gas mixture of 24.17% $N_2$, 72.20% $H_2$ and 3.73% $NH_3$ at a flow rate of 30 Nl/h at 100 bar and at room temperature. The content of ammonia in the outlet gas stream was measured online with an infrared analyzer. The zeolite was saturated with ammonia when the outlet concentration of ammonia was equal to the inlet concentration. The amount of adsorbed ammonia was determined by integration of the ammonia outlet trace. The adsorbed amount was determined to be 0.69 g ammonia.

After the zeolite had been filly saturated with ammonia the saturated zeolite was then heated from room temperature to 140° C. with a heating rate of 3° C./min at 100 bar in a flow of 30 Nl/h of a hydrogen-nitrogen mixture having a $H_2:N_2$ molar ratio of 3:1. As in the adsorption study the content of ammonia in the outlet gas stream was recorded online with an infrared analyzer. The desorption was completed when there was no measurable amount of ammonia in the outlet stream. The amount of desorbed ammonia was determined by integration of the ammonia outlet trace. The desorbed amount was determined to be 0.73 g ammonia.

The repeatability of the experiment was tested by carrying out further adsorption/desorption cycles exactly as described above. Thus, in a second cycle, 0.71 g ammonia was adsorbed and 0.73 g ammonia was desorbed, and, in a third cycle, 0.70 g ammonia was adsorbed and 0.70 g ammonia was desorbed.

What is claimed is:

1. A process for removal and subsequent recovery of ammonia from a purge gas stream comprising ammonia, hydrogen, nitrogen, argon, helium and methane from an ammonia synthesis loop, comprising the steps of
    (a) introducing the purge gas stream into a first ammonia adsorber comprising a selective ammonia adsorbing agent,
    (b) adsorbing ammonia in the purge gas on the ammonia adsorbing agent at the same pressure as the pressure of the synthesis loop,
    (c) withdrawing an ammonia free purge gas from the first ammonia adsorber,
    (d) introducing a make-up gas stream comprising hydrogen, nitrogen and traces of at least one of argon, helium and methane to a second ammonia adsorber comprising a selective ammonia adsorbing agent saturated with ammonia,
    (e) removing ammonia from the ammonia adsorbing agent saturated with ammonia by the make-up gas at the same pressure as the pressure in the synthesis loop,
    (f) withdrawing an ammonia containing effluent from the second ammonia adsorber and introducing the effluent to the ammonia synthesis loop at the make-up gas addition point, and
    (g) introducing after a pre-set period of time the purge gas to the second ammonia adsorber as steps (a) to (c) and simultaneously introducing the ammonia free make-up gas to the first ammonia adsorber as steps (d) to (f).

2. A process according to claim 1, wherein the content of ammonia in the purge gas is not more than 10% by volume.

3. A process according to claim 1, wherein the content of ammonia in the purge gas is between 2% and 6% by volume.

4. A process according to claim 1, wherein the pressure of the ammonia synthesis loop is between 5 and 25 MPa.

5. A process according to claim 1, wherein the pressure of the ammonia synthesis loop is between 8 and 18 MPa.

* * * * *